US008639679B1

(12) United States Patent
Zhou (10) Patent No.: US 8,639,679 B1
(45) Date of Patent: Jan. 28, 2014

(54) GENERATING QUERY SUGGESTIONS

(75) Inventor: Xin Zhou, Haidian (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/102,013

(22) Filed: May 5, 2011

(51) Int. Cl.
*G06F 7/00* (2006.01)
*G06F 17/30* (2006.01)

(52) U.S. Cl.
USPC .......................................... 707/706; 707/760

(58) Field of Classification Search
USPC ........................................................ 707/706
See application file for complete search history.

(56) References Cited

U.S. PATENT DOCUMENTS

| | | | |
|---|---|---|---|
| 6,772,150 B1 * | 8/2004 | Whitman et al. ............. | 707/721 |
| 7,685,099 B2 * | 3/2010 | Liu et al. .......................... | 706/8 |
| 7,844,599 B2 * | 11/2010 | Kasperski et al. ............. | 707/713 |
| 8,027,964 B2 * | 9/2011 | Boulis ........................... | 707/705 |
| 2005/0080782 A1 * | 4/2005 | Ratnaparkhi et al. ............. | 707/5 |
| 2005/0283468 A1 * | 12/2005 | Kamvar et al. ................... | 707/3 |
| 2007/0088681 A1 * | 4/2007 | Aravamudan et al. ............ | 707/3 |
| 2008/0126308 A1 * | 5/2008 | Wooldridge et al. ............. | 707/3 |
| 2008/0256061 A1 * | 10/2008 | Chang et al. ....................... | 707/5 |
| 2009/0019002 A1 * | 1/2009 | Boulis ............................. | 707/3 |
| 2009/0119289 A1 * | 5/2009 | Gibbs et al. ....................... | 707/5 |
| 2009/0132529 A1 * | 5/2009 | Gibbs ............................... | 707/5 |
| 2009/0187515 A1 * | 7/2009 | Andrew et al. ................. | 706/12 |
| 2011/0191364 A1 * | 8/2011 | LeBeau et al. ................. | 707/767 |
| 2011/0202520 A1 * | 8/2011 | Teran et al. ................... | 707/708 |
| 2011/0258212 A1 * | 10/2011 | Lu et al. .......................... | 707/760 |
| 2011/0264681 A1 * | 10/2011 | Kimberlin et al. ............ | 707/767 |
| 2011/0320470 A1 * | 12/2011 | Williams et al. .............. | 707/767 |
| 2012/0023120 A1 * | 1/2012 | Kanefsky ...................... | 707/767 |
| 2012/0036123 A1 * | 2/2012 | Hasan et al. ................... | 707/723 |
| 2012/0130978 A1 * | 5/2012 | Li et al. .......................... | 707/706 |

* cited by examiner

Primary Examiner — Binh V Ho
(74) Attorney, Agent, or Firm — Fish & Richardson P.C.

(57) ABSTRACT

Methods, systems, apparatus, including computer program products, for generating search query suggestions. In one aspect, a method includes receiving a partial search query entered by a user through a user interface of a client device, generating a set of predicted complete queries, wherein at least a subset of the predicted complete queries are queries associated with the user, identifying one or more of the set of complete queries as being selectable suggestions to the partial search query for display in the user interface of the client for possible selection by the user.

12 Claims, 5 Drawing Sheets

GENERATING QUERY SUGGESTIONS

BACKGROUND

This specification relates to digital data processing, and in particular, to computer-implemented suggestion services.

Conventional suggestion services provide search query suggestions as alternatives to input search queries. For example, a conventional search engine can include a query input field that receives an input search query. In response to receiving the input search query, a conventional suggestion service can provide search query suggestions for the input search query. A user can select a search query suggestion for use as a search query.

SUMMARY

This specification describes techniques by which a search engine system can provide query suggestions while a user is entering (i.e., before the user completes entry of) a search query. In general, the query suggestions can be selected from candidate suggestions derived from a collection of queries submitted earlier by the user and a collection that includes queries submitted by other users. The query suggestions can optionally be made to include candidates derived from each of the collections. The candidate suggestions can be scored and ranked, and suggestions provided to the user can be limited to only the highest ranking ones. Suggestions can be query completions or alternative queries. The user can be known to the system through a user login or through an anonymous identification, e.g., an Internet cookie. The collection of queries submitted by the user can be maintained exclusively on a client device personal to the user—for example, a magnetic disk on a personal computer or a flash memory on a portable device such as a smart phone—and, in that case, no user identity or individual history information needs to be maintained or used outside the client device, and the candidate query suggestions can be ranked and selected on the client device.

Particular embodiments of the subject matter described in this specification can be implemented to realize one or more of the following advantages. Automatically obtaining and displaying query suggestions reduces how much user interaction is required to obtain alternatives to an input search query, obtain information for the alternatives, and perform searches using one or more of the alternatives. Automatically obtaining these input suggestions may be of particular interest in situations when a reduced number of user inputs is desirable, for instance due to restrictions of the user interface, e.g., in handheld devices or in voice-operated devices, or when the user is multitasking.

Providing query suggestions that are directed to a particular user can also increase the precision, accuracy, and coverage of a search by capturing alternatives to the input search query that are directed to what a user may consider to be relevant to the search. Moreover, as only one request and, in some cases, one return data package may be sent, the reliability and speed of providing the suggestions can be improved. This can be advantageous in situations where the network connection may not be robust, e.g., in certain wireless networks. Furthermore, there can be advantages on the server-side in reducing the number of requests as the resources of a server to which a request is addressed may be allocated more efficiently if confronted with a reduced number of different user requests. By providing suggestions to the user, the probability of receiving search queries which are already known to the server can be increased. The workload for the server can be reduced as the probability that the server may have already determined search results for a suggestion is increased. As such, an average time to serve search results to a user can be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
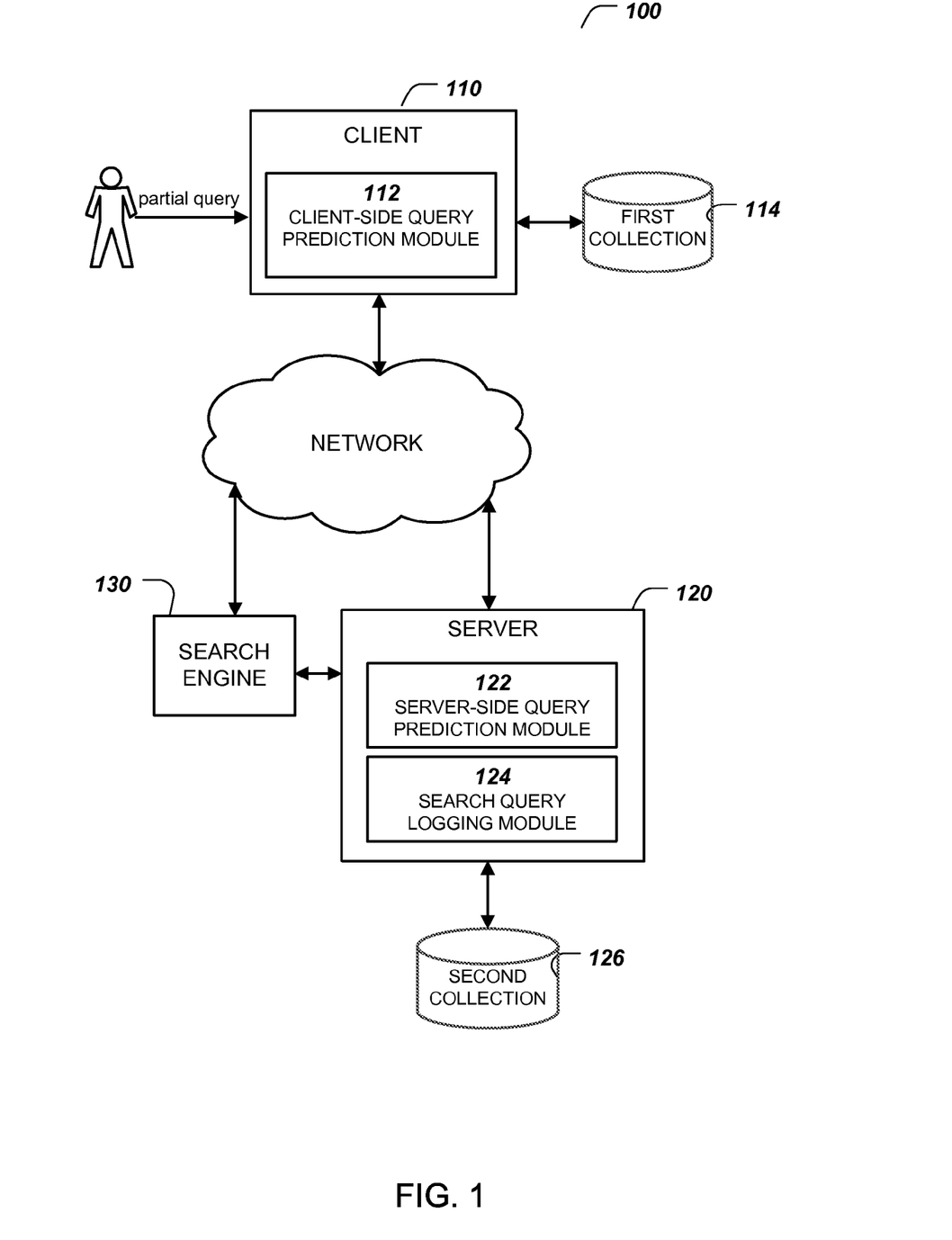
FIG. 1 is a diagram illustrating an example of a flow of data in some implementations of a system that generates query suggestions.

FIG. 1 is a diagram illustrating an example of a flow of data in some implementations of a system 100 that generates query suggestions. A client-side query prediction module 112, e.g., a JavaScript script, running on a client device 110 monitors input, e.g., a portion of a query, received in a search engine query input field from a particular user.

In some implementations, the client-side query prediction module 112 is plug-in software that is installed in a web browser running on the client device 110. In some alternative implementations, the client-side query prediction module 112 is installed on an intermediate server that receives the input directly or indirectly from the client device 115.

The client-side query prediction module 112 can determine, from a first collection 114 of first query suggestions, selectable suggestions to the input as the input is received. A collection of query suggestions can be stored on multiple devices in multiple sites. The first collection 114 is a collection of search queries that include only queries previously submitted by the particular user. The first collection 114 can be stored on a device connected to the client 110. Alternatively or in addition, the first collection 114 can be stored on a device to which the client 110 has access through a network, e.g., a local area network (LAN) or a wide area network (WAN).

A server-side query prediction module 122, running on a server 120, receives the input from the client 110. The server-side query prediction module 122 can determine, from a different, second collection 126 of second query suggestions, selectable suggestions to the input as the input is received. The second query suggestions include queries previously submitted by a community of users of the search engine 130. Specifically, the second collection 126 includes queries submitted by users other than the particular user. In particular, the second collection 126 includes at least one query not previously submitted by the particular user.

The search query logging module 124, running on the server 120, logs search queries submitted by the community of users of the search engine 130. In addition to storing the search queries, the search query logging module 124 can store metadata associated with the search queries, e.g., a number of times the queries were submitted, a frequency of submission of the queries in a specified time period before receiving the input, and a time of the most recent submission of the queries, by a community of users of the search engine 130 or by the particular user alone. In some implementations, the logged search queries and their associated metadata can be anonymized so that they cannot be associated with a particular user or user identifier.

The server-side query prediction module 122 determines, from the input, second query suggestions to provide to the client-side query prediction module 112. In addition to providing one or more second query suggestions to the client-side query prediction module 112, the server-side query prediction module 122 can provide associated metadata that can be used to determine scores for the second query suggestions.

The client-side query prediction module 112 receives the one or more second query suggestions and determines selectable suggestions to the input from the one or more second query suggestions and the one or more first query suggestions. The first query suggestions can also be associated with metadata that can be used to score the first query suggestions. Such metadata can include a number of times the query suggestion has been recorded at the client, a frequency of submission of the query suggestion in a specified time period before receiving the input, a time of the most recent submission of the query suggestion, and so on. Using conventional techniques, the first query suggestions and the second query suggestions can be ranked according to their respective scores. For example, the score of the first query suggestion can be the total number of times the query suggestion has been recorded at the client, or the frequency of submission of the query suggestion in a specified time period before receiving the input, or a time of the most recent submission of the query suggestion, or combination thereof. For example, the score of the first query suggestion can be obtained by multiplying the total number of times the query suggestion has been recorded at the client with the frequency of submission of the query suggestion in a specified time period before receiving the input. The score of the second query suggestion can be constructed using the same scheme as that for the first query suggestion, or based on a different scheme using the same types of metadata.

Figure 2:
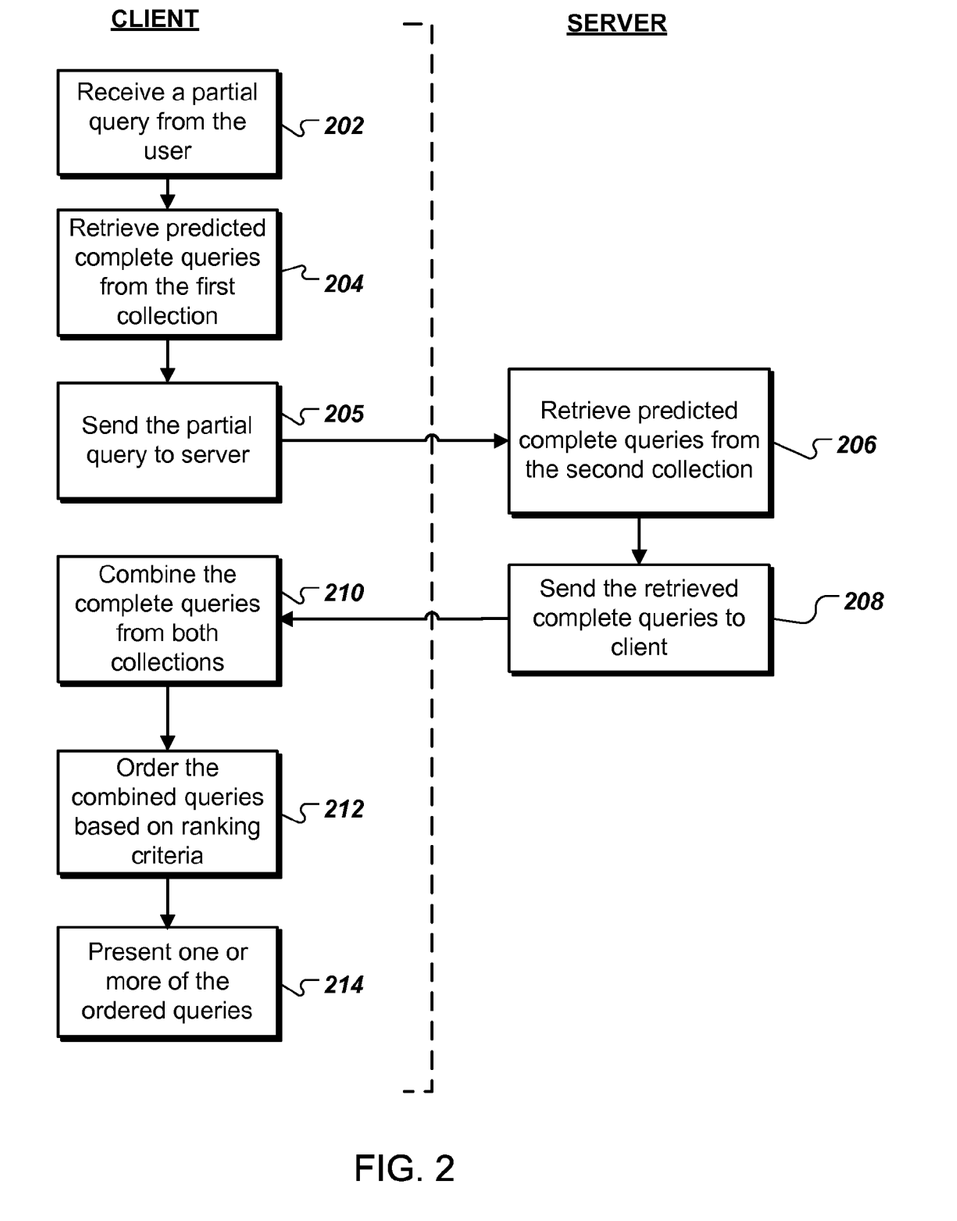
FIG. 2 is a flow chart showing an example process for generating query suggestions.

FIG. 2 is a flow chart showing an example process for generating query suggestions. In this process, the client 110 receives 202 a partial query input through an interface of a search engine. The client-side query prediction module 112 retrieves 204 predicted complete queries from the first collection 114, i.e., first query suggestions, as the partial query input is received.

For example, if the intended search query is "hotels in Beijing", when each character of the intended search query is entered into the input field, receipt of each character will trigger an event handler, e.g., an Ajax handler. The event handler generates calls to a communication engine, e.g., an Ajax engine, that sends asynchronous requests, e.g., XMLHttpRequest requests, for first and second query suggestions. In some implementations, a call to the communication engine is generated immediately after each token of a textual input, e.g., after each character of a first search query or each word of a first search query, is received at the search engine query input field. As a result, selectable suggestions to the input can be provided to the user as the user types each token of the input. In some alternative implementations, a delay is implemented, where a predetermined amount of time passes before the request for selectable suggestions is made. The predetermined amount of time is specified in the client-side query prediction module 112.

The query suggestions can be alternatives to the input that are representative of the input, e.g., spell corrected versions of the input, or completions or expansions of the input. In the example, if the partial search query received is "hotels", a first query suggestion "Beijing hotels" may be returned.

The partial search query is also sent 205 to a suggestion service, e.g., provided by the server-side query prediction module 122 running on server 120. The suggestion service can retrieve 206 predicted complete queries (e.g., second query suggestions) and send 208 the retrieved complete queries to the client 110. Upon receiving the set of predicted complete queries from the server 120, the query prediction module at the client 110 can combine 210 the first query suggestions and the second query suggestions to obtain a list of complete queries associated with the partial query.

The list of complete queries can be ordered 212, e.g., scored and ranked, based on ranking criteria; and queries having a ranking or score exceeding a threshold value, such as the first five or the first ten queries in the ordered list, can be selected for presentation 214 in the user interface, e.g., in a dropdown list below the query input field.

In some implementations, the first collection 114 is maintained by the client-side query prediction module 112. Each time the user submits a search query for a search, the search query (and associated metadata) is added to the first collection 114. Similarly, the second collection 126 can also include submitted queries and associated metadata.

Figure 3:
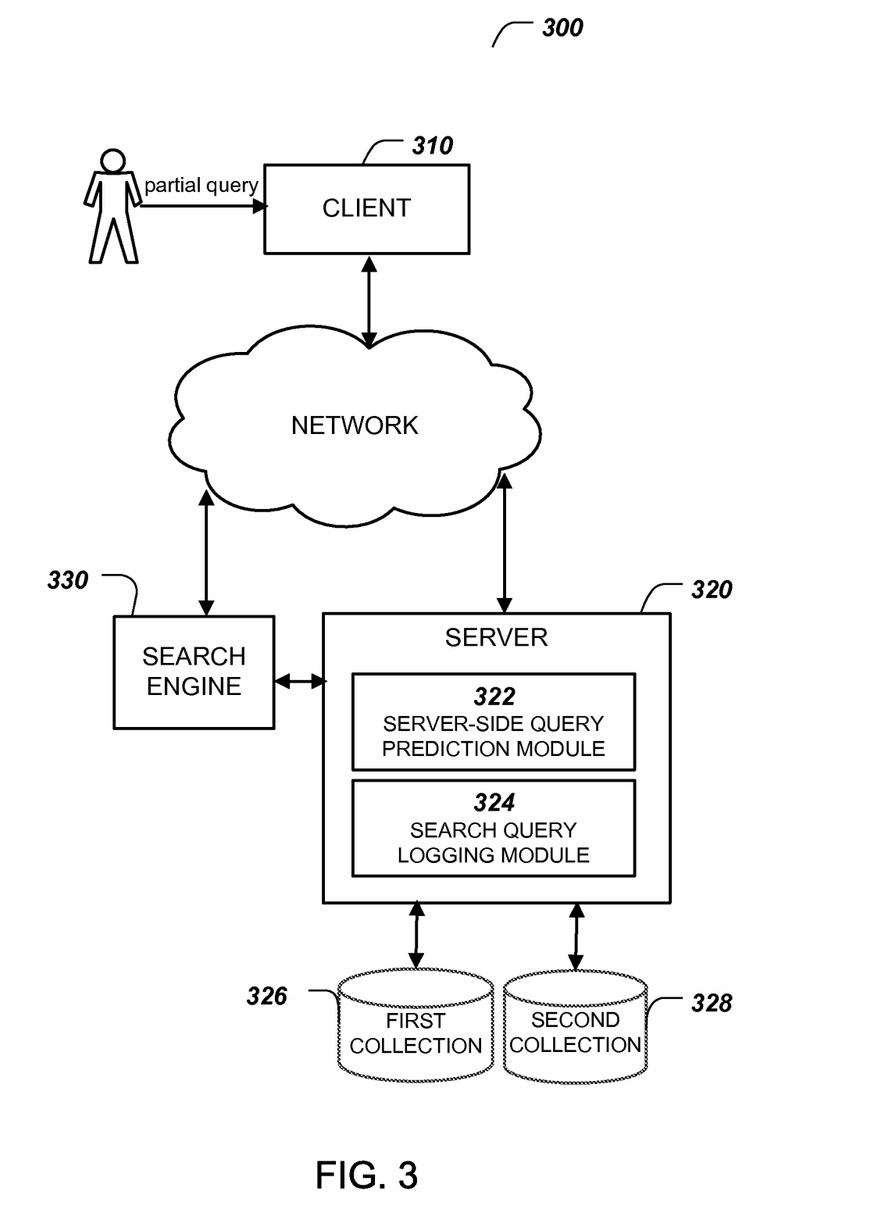
FIG. 3 is a diagram illustrating an example of a flow of data in some implementations of another system that generates query suggestions.

FIG. 3 is a diagram illustrating an example of a flow of data in some implementations of another system 300 that generates query suggestions. The system 300 includes a client 310. The server 320 is configured to maintain a first collection 326 and a second collection 328 and respond to query prediction requests, in this case, partial queries, from clients. The server 320 includes a server-side query prediction module 322 and a search query logging module 324. The server-side query prediction module 322, which accesses the first collection 326 and the second collection 328 that may be local to the server 320, e.g., that may be accessed without going through the network, is configured to process partial queries received from the client. The server-side query prediction module 322 retrieves predicted complete queries from the first collection 326 and the second collection 328, e.g., first query suggestions and second query suggestions, combines the retrieved queries, and sends the combination to the client 310. The search query logging module 324 is configured to communicate with the search engine 330 and log various search queries submitted by users of the search engine 330, obtain metadata associated with the search queries, and store the queries and the metadata in the second collection 328.

Figure 4:
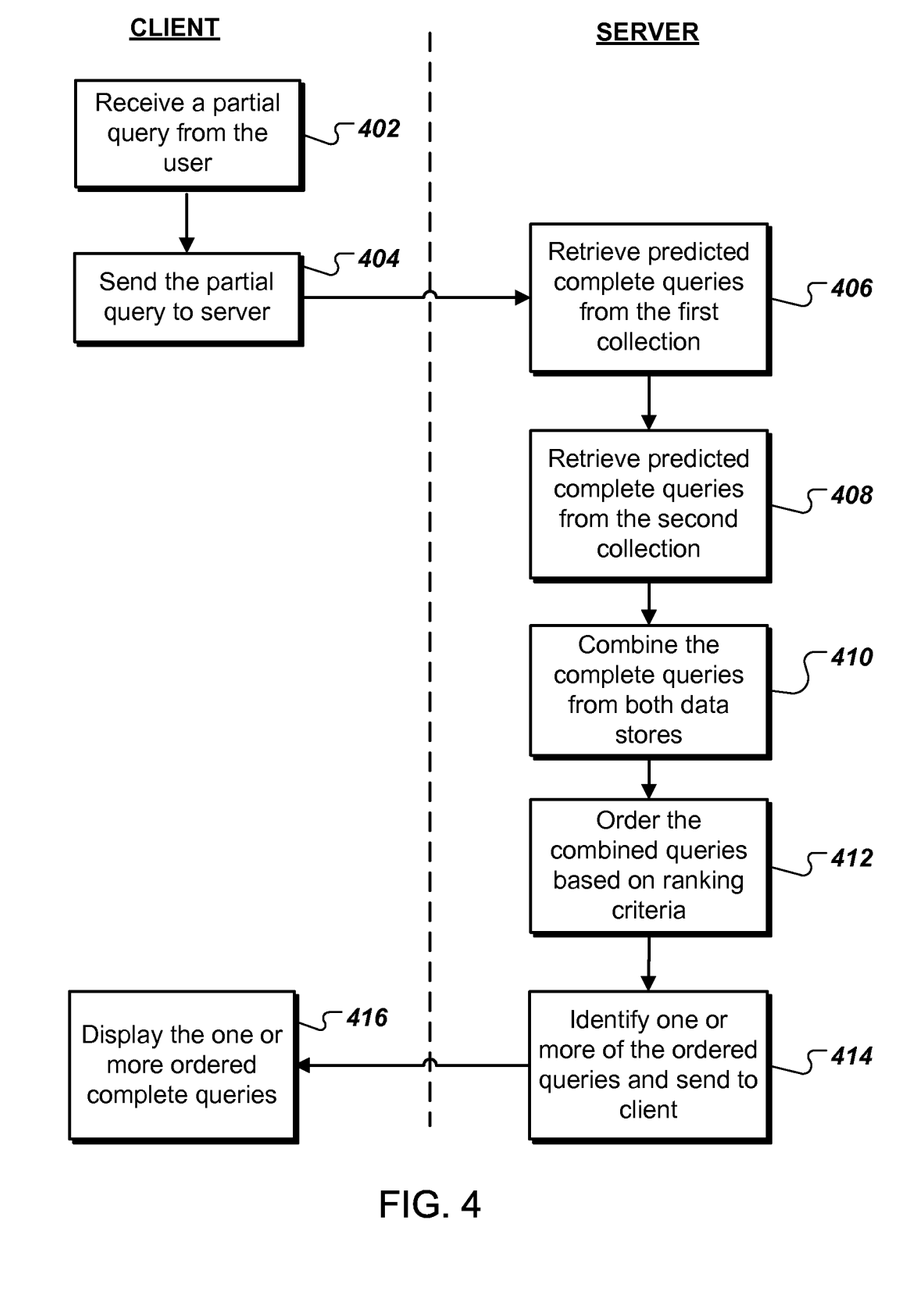
FIG. 4 is a flow chart showing another example process for generating query suggestions.

FIG. 4 is a flow chart showing another example process for generating query suggestions. The client 310 receives 402 a partial query. The partial query is sent 404 to the server 320. The server-side query prediction module 322 retrieves 406 predicted complete queries from the first collection 326, retrieves 408 predicted complete queries from the second collection 324, and combines 410 the predicted complete queries from both collections. The predicted complete queries can be ordered 412 by the server-side query prediction module 322 based on ranking criteria. The ranking criteria can include one or more of the following: a number of times the queries were submitted, a frequency of submission of the queries in a specified time period before receiving the input, and a time of the most recent submission of the queries, either by a community of users of the search engine 130 or by the particular user. One or more of the ordered queries can be identified 414 and sent to the client 310 for display 416 and possible selection by the user.

In some implementations, the query suggestions are identified as being submitted by a particular user from identifiers associated with the user and the query suggestions. For example, the user may be a user of a client-side application, e.g., a web browser. Cookie information logged at the client can be used as an identifier associated with the user. In some implementations, the cookie information is shared between different software applications (e.g., web browsers) located on the same client computer. In some implementations, the cookie can be shared across multiple domains. As another example, the user may have logged-in to a certain online system, e.g., logged-in to a web portal account, an email account, or a social network account. The user name for the online system can be used to generate the identifier. In these and other implementations, personalized query suggestions can be provided when the user is logged-in using the account.

Query suggestions that are relevant to the user's history can be provided while also protecting the user's privacy. For example, the identifiers associated with the user and the query suggestions can be anonymized for privacy protection, so that the data, if compromised, cannot be associated with a particular user or user identifier. Various anonymization processes, such as hashing, encryption and obfuscation techniques, can be used to ensure that subject privacy is protected. As an example, the cookie information can be anonymized using these processes.

The description above describes, in part, functions performed by a client device and a server. Other implementations that combine or subdivide the functions performed by these components in ways other than those described above are possible.

Figure 5:
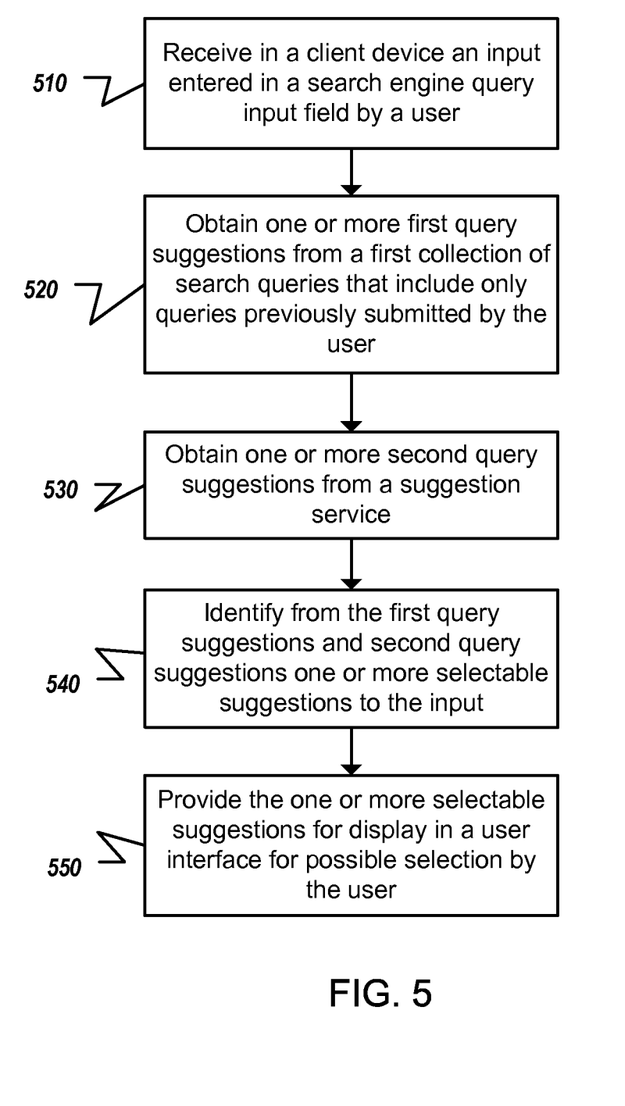
FIG. 5 is a flow chart showing another example process for generating query suggestions.

FIG. 5 is a flow chart showing another example process for generating query suggestions. The process includes receiving 510 in a client device an input entered in a search engine query input field by a user. The process includes obtaining 520 one or more first query suggestions from a first collection of search queries that include only queries previously submitted by the user. The process includes obtaining 530 one or more second query suggestions from a suggestion service. The process includes identifying 540 from the first query suggestions and second query suggestions one or more selectable suggestions to the input. The process includes providing 550 the one or more selectable suggestions for display in a user interface for possible selection by the user.

In some implementations, the process also includes rendering in the user interface the first query suggestions in the selectable suggestions with visual features distinct from the second query suggestions in the selectable suggestions. For example, the first query suggestions can be rendered in a first color so that they are distinguishable from the second query suggestions that are rendered in a different, second color.

Embodiments of the subject matter and the functional operations described in this specification may be implemented in digital electronic circuitry, in tangibly-embodied computer software or firmware, in hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions may be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving an input entered in a search engine query input field by a user;
   selecting one or more second query suggestions, wherein the second query suggestions are search queries previously submitted by other users of the search engine and not by the user;
   selecting one or more first query suggestions, wherein the first query suggestions are search queries previously submitted by the user;
   determining a respective score for each first query suggestion and each second query suggestion, wherein determining a respective score for each first query suggestion comprises determining the respective score for each first query suggestion based on one or more of the following: a number of times the first query suggestion was submitted as a query by the user, a frequency of submission of the first query suggestion as a query in a specified time period by the user before receiving the input, a time of the most recent submission of the first query suggestion as a query by the user, or a multiplication of the number of times the first query suggestion was submitted as a query by the user with the frequency of submission of the first query suggestion as a query in a specified time period by the user before receiving the input;
   ranking the first query suggestions and the second query suggestions according to the respective scores;
   identifying from the first query suggestions and second query suggestions one or more selectable suggestions to the input based on the ranking; and
   providing the one or more selectable suggestions for display in a user interface for possible selection by the user, wherein the first query suggestions in the selectable suggestions are rendered in the user interface with visual features distinct from visual features of the second query suggestions in the selectable suggestions.

2. The method of claim 1, where the first query suggestions are selected from a first collection of search queries stored in a common database and the second query suggestions are selected from a different, second collection of search queries stored in the common database.

3. The method of claim 1, wherein determining the respective score for each of the second query suggestions comprises:
   determining the respective score for each second query suggestions based on one or more of the following: a number of times the second query suggestion was submitted as a query, a frequency of submission of the second query suggestion as a query in a specified time period before receiving the input, a time of the most recent submission of the second query suggestion as a query, or a multiplication of the number of times the second query suggestion was submitted as a query with the frequency of submission of the second query suggestion as a query in a specified time period before receiving the input.

4. The method of claim 1, wherein the selectable suggestions include at least one of the first query suggestions and at least one of the second query suggestions.

5. A computer-implemented method, comprising:
   receiving an input entered in a search engine query input field by a user;
   selecting one or more first query suggestions, wherein the one or more first query suggestions are queries previously submitted by the user;
   selecting one or more second query suggestions, wherein the second query suggestions are queries previously submitted by other users of the search engine and not by the user;

determining a respective score for each first query suggestion and each second query suggestion, wherein determining a respective score for each first query suggestion comprises determining the respective score for each first query suggestion based on one or more of the following: a number of times the first query suggestion was submitted as a query by the user, a frequency of submission of the first query suggestion as a query in a specified time period by the user before receiving the input, a time of the most recent submission of the first query suggestion as a query by the user, or a multiplication of the number of times the first query suggestion was submitted as a query by the user with the frequency of submission of the first query suggestion as a query in a specified time period by the user before receiving the input;

ranking the first query suggestions and the second query suggestions according to the respective scores;

selecting at least one of the first query suggestions and at least one of the second query suggestions based on the ranking; and providing the selected first query suggestions and second query suggestions as selectable suggestions for display in a user interface for possible selection by the user, wherein the first query suggestions in the selectable suggestions are rendered in the user interface with visual features distinct from visual features of the second query suggestions in the selectable suggestions.

6. The method of claim 5, wherein the first query suggestions are obtained from a first collection of search queries stored in a common database and the second query suggestions are obtained from a different, second collection of search queries stored in the common database.

7. A system, comprising:
one or more computers and one or more storage devices storing instructions that when executed by the one or more computers cause the one or more computers to perform operations comprising:

receiving an input entered in a search engine query input field by a user;

selecting one or more second query suggestions, wherein the second query suggestions are search queries previously submitted by other users of the search engine and not by the user;

selecting one or more first query suggestions, wherein the first query suggestions are search queries previously submitted by the user;

determining a respective score for each first query suggestion and each second query suggestion, wherein determining a respective score for each first query suggestion comprises determining the respective score for each first query suggestion based on one or more of the following: a number of times the first query suggestion was submitted as a query by the user, a frequency of submission of the first query suggestion as a query in a specified time period by the user before receiving the input, a time of the most recent submission of the first query suggestion as a query by the user, or a multiplication of the number of times the first query suggestion was submitted as a query by the user with the frequency of submission of the first query suggestion as a query in a specified time period by the user before receiving the input;

ranking the first query suggestions and the second query suggestions according to the respective scores;

identifying from the first query suggestions and second query suggestions one or more selectable suggestions to the input based on the ranking; and providing the one or more selectable suggestions for display in a user interface for possible selection by the user, wherein the first query suggestions in the selectable suggestions are rendered in the user interface with visual features distinct from visual features of the second query suggestions in the selectable suggestions.

8. The system of claim 7, where the first query suggestions are selected from a first collection of search queries stored in a common database and the second query suggestions are selected from a different, second collection of search queries stored in the common database.

9. The system of claim 7, wherein determining the respective score for each of the second query suggestions comprises:

determining the respective score for each second query suggestions based on one or more of the following: a number of times the second query suggestion was submitted as a query, a frequency of submission of the second query suggestion as a query in a specified time period before receiving the input, a time of the most recent submission of the second query suggestion as a query, or a multiplication of the number of times the second query suggestion was submitted as a query with the frequency of submission of the second query suggestion as a query in a specified time period before receiving the input.

10. The system of claim 7, where the selectable suggestions include at least one of the first query suggestions and at least one of the second query suggestions.

11. A system, comprising:
one or more computers and one or more storage devices storing instructions that when executed by the one or more computers cause the one or more computers to perform operations comprising:

receiving an input entered in a search engine query input field by a user;

selecting one or more first query suggestions, wherein the one or more first query suggestions are queries previously submitted by the user;

selecting one or more second query suggestions, wherein the second query suggestions are queries previously submitted by other users of the search engine and not by the user;

determining a respective score for each first query suggestion and each second query suggestion, wherein determining a respective score for each first query suggestion comprises determining the respective score for each first query suggestion based on one or more of the following: a number of times the first query suggestion was submitted as a query by the user, a frequency of submission of the first query suggestion as a query in a specified time period by the user before receiving the input, a time of the most recent submission of the first query suggestion as a query by the user, or a multiplication of the number of times the first query suggestion was submitted as a query by the user with the frequency of submission of the first query suggestion as a query in a specified time period by the user before receiving the input;

ranking the first query suggestions and the second query suggestions according to the respective scores;

selecting at least one of the first query suggestions and at least one of the second query suggestions based on the ranking; and providing the selected first query suggestions and second query suggestions as selectable suggestions for display in a user interface for possible selection by the user, wherein the first query suggestions in the selectable suggestions are rendered in the user interface with visual features distinct from visual features of the second query suggestions in the selectable suggestions.

12. The system of claim 11, wherein the first query suggestions are obtained from a first collection of search queries stored in a common database and the second query suggestions are obtained from a different, second collection of search queries stored in the common database.

* * * * *